United States Patent
Chellapilla et al.

(10) Patent No.: US 7,885,952 B2
(45) Date of Patent: Feb. 8, 2011

(54) CLOAKING DETECTION UTILIZING POPULARITY AND MARKET VALUE

(75) Inventors: Kumar H. Chellapilla, Redmond, WA (US); David M. Chickering, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 138 days.

(21) Appl. No.: 11/613,725

(22) Filed: Dec. 20, 2006

(65) Prior Publication Data

US 2008/0154847 A1    Jun. 26, 2008

(51) Int. Cl.
*G06F 7/00* (2006.01)

(52) U.S. Cl. .................. 707/710; 707/707; 707/708; 707/709

(58) Field of Classification Search ............... 707/2–6, 707/707–710
See application file for complete search history.

(56) References Cited

U.S. PATENT DOCUMENTS

| | | | |
|---|---|---|---|
| 6,560,600 B1 | 5/2003 | Broder | |
| 6,751,612 B1 | 6/2004 | Schuetze et al. | |
| 7,349,901 B2 * | 3/2008 | Ramarathnam et al. | 707/6 |
| 2003/0131048 A1 * | 7/2003 | Najork | 709/203 |
| 2005/0149395 A1 * | 7/2005 | Henkin et al. | 705/14 |
| 2005/0289520 A1 | 12/2005 | Overall | |
| 2006/0004628 A1 * | 1/2006 | Axe et al. | 705/14 |
| 2006/0004748 A1 | 1/2006 | Ramarathnam et al. | |
| 2006/0020672 A1 | 1/2006 | Shannon et al. | |
| 2006/0036598 A1 | 2/2006 | Wu | |
| 2006/0095416 A1 | 5/2006 | Barkhin et al. | |
| 2006/0122991 A1 | 6/2006 | Chandrasekar et al. | |
| 2006/0173818 A1 | 8/2006 | Berstis et al. | |
| 2006/0184500 A1 | 8/2006 | Najork et al. | |
| 2006/0265400 A1 * | 11/2006 | Fain et al. | 707/10 |

OTHER PUBLICATIONS

"Detecting Semantic Cloaking on the Web" by Wu et al., ACM May 23-26, 2006.*
"Cloaking and Redirection: A Preliminary Study" by Wu et al., May 10, 2005.*
Jones, T.; Both Sides of the Digital Battle for a High Rank from a Search Engine; 2005; 9 pages.
Baoning, W., et al.; Cloaking and Redirection: A Preliminary Study; 2005; 10 pages.
Benczur, A., et al.; SpamRank—Fully Automatic Link Spam Detection Work in progress; 19 pages.

* cited by examiner

*Primary Examiner*—Apu M Mofiz
*Assistant Examiner*—Cindy Nguyen
(74) *Attorney, Agent, or Firm*—Turocy & Watson, LLP

(57) ABSTRACT

The subject disclosure pertains to systems and methods that facilitate detection of cloaked web pages. Commercial value of search terms and/or queries can be indicative of the likelihood that web pages associated with the keywords or queries are cloaked. Commercial value can be determined based upon popularity of terms and/or advertisement market value as established based upon advertising revenue, fees and the like. Commercial value can be utilized in conjunction with term frequency difference analysis to identify a cloaked page automatically. In addition, commercial values of terms associated with web pages can be used to order or prioritize web pages for further analysis.

19 Claims, 16 Drawing Sheets

CLOAKING DETECTION UTILIZING POPULARITY AND MARKET VALUE

BACKGROUND

The Internet has become widely utilized as an advertising means for businesses. Search engines, in addition to providing results for user queries, also serve advertisements alongside the search results. The advertisements served may be related to the search query. The more relevant the advertisements are to user's intent and the query, the greater the value to users, businesses, and search engines. However, the high amounts of revenue associated with Internet sales and advertising are also an incentive for vendors to manipulate search engines to include vendor web page links within the search results or increase ranking of a vendor web page link within the search results Search result can be manipulated by providing false information to web crawlers/bots. Search engines typically utilize web crawlers or bots to search the Internet for web site content, copying web pages or information. The search engine can utilize this information to generate an index that facilitates searches. There are many legitimate reasons for providing different information or a different version of a web page to a crawler and a browser. For instance, web servers may remove images or audio content from web page information provided to a crawler to minimize bandwidth. However, some unscrupulous servers seek to manipulate search engines by providing one set of information to the crawler and presenting a substantially different web page to users. This type of manipulation is often referred to as "cloaking," a particular type of web spam in which users are redirected to undesired web sites. Web spam is somewhat similar to email spam, where unsolicited information and/or advertisements are sent to users. Spam in general is the electronic equivalent of traditional junk mail.

Due to the nature and volume of spam, spam is considered a nuisance that inconveniences users and creates user frustration. Not only do users waste time sorting through a deluge of undesired information, but they also likely bear the costs of the tremendous amounts of resources (e.g., storage space, network bandwidth, faster processors, . . . ) required to cope with various forms of spam (e.g., irrelevant search results, email advertisements, etc.). A variety of systems and techniques have been developed and employed to combat spam in both the Web and email, often requiring numerous filtering processes. Once identified, action is taken on the content such as redirection to a designated location (e.g., spam folder, quarantine region . . . and/or deletion, etc. However, the traditional filtering methods frequently fall far short of adequately eliminating undesired spam.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the provided subject matter concerns facilitating detection of cloaked or spammed web pages. Internet advertising has become a large and profitable business, creating an incentive for spammers to manipulate web search results. Web spammers can provide search engine crawlers with false web pages or information to ensure that their pages are highly ranked and provide entirely different pages to users. Because web spammers tend to target valuable search terms or queries, the value of a term or terms is indicative probability that a spammer has targeted the term. Accordingly, value of terms and/or queries can be used in identification of cloaked web pages.

Economic or commercial value of keywords, phrases or queries can be measured based upon popularity and/or market value. Typically, the more users utilize a search term, the greater the traffic to the web pages links included within the search results and the greater the value term. Consequently, popularity of terms is generally indicative of economic value. Market value of terms can be determined based upon advertising information (e.g., bid price, revenue) of terms. Various query and/or advertising logs can be utilized to determine popularity and market values.

Term values can be used in combination with term difference analysis to identify cloaked pages automatically. Traditional term frequency difference analysis evaluates differences between web page versions provided to a crawler and web page versions provided to a browser to detect cloaked pages. Identification of cloaked pages can be enhanced by evaluating popularity and/or market value of term differences.

Popularity and/or market values can also be used to prioritize web pages for further evaluation. Frequently, search engines employ people to manually review web pages and identify web spam. However, the sheer number of web pages makes it impossible to manually evaluate each page. To increase the probability that cloaked pages are evaluated and identified, web pages returned in response to popular or valuable terms can receive priority during the evaluation process.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
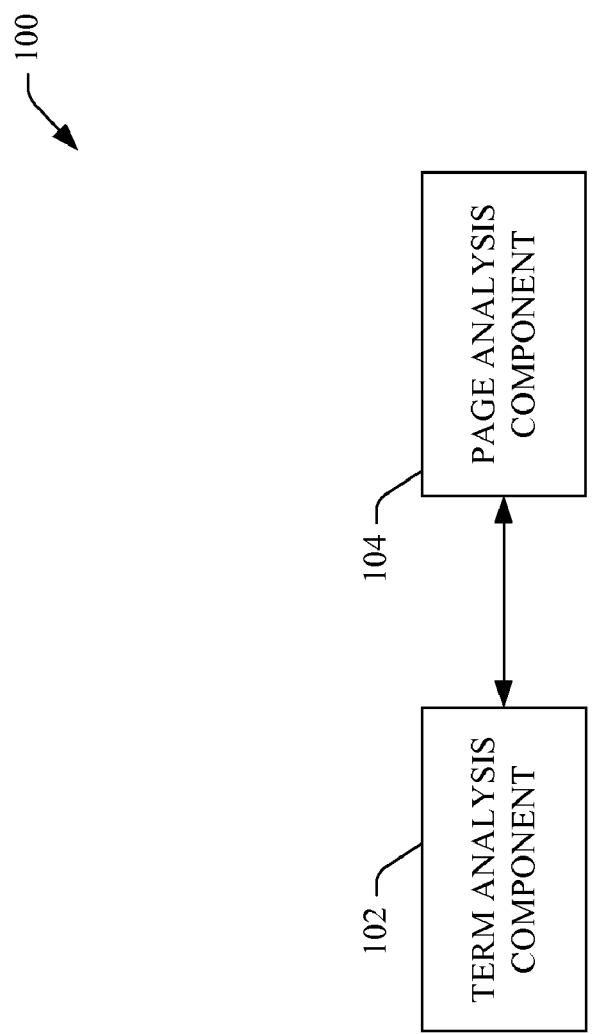
FIG. 1 is a block diagram of a system that facilitates cloaked web page identification in accordance with an aspect of the subject matter disclosed herein.

The various aspects of the subject matter disclosed herein are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. The subject matter disclosed herein is not limited by such examples. In addition, any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Commercial web sites generally try to maximize the number of users that view their web site, since increases in web site traffic typically result in increases in business revenue. The more users that view the page, the greater the number of possible customers. Legitimate techniques, such as search engine optimization (SEO), can increase site traffic. For example, web site operators can optimize their sites to ensure that search engine crawlers can locate and index the site. In addition, the overall quality of a web site can be improved by offering added value to online users, thereby increasing search result ranking.

The monetary incentives that encourage web site optimization also incentivize illegitimate or duplicitous techniques designed to manipulate search engine results and divert users. Cloaking is a technique utilized by Web servers to deliver one page to a search engine for indexing purposes while providing a second, distinct page to users browsing the site. Web servers can distinguish between search engines and other users based upon examining the user-agent string or IP address of the client accessing the site. Some spammers maintain lists of IP addresses used by search engines and identify web crawlers or bots by matching IP addresses. Cloaking distorts search engine rankings in favor of the cloaked page.

The utility of search results can be reduced by excessive amounts of web spam. Users are likely to become frustrated if they are forced to search through irrelevant results. Eventually, users may utilize alternative search engines that are better able to filter search results to remove web spam. Reductions in numbers of users may force reductions in advertising fees and loss of revenue. Consequently, there is a financial incentive for search engine operators to identify and eliminate or reduce rankings of web spam.

The same financial incentives that cause spammers to target certain terms can assist search engines in identifying web spam. Spammers have a greater monetary incentive to cloak or spam web pages where there is significant monetary value in redirecting users. For instance, a user searching based upon the phrase "theory of relativity" is likely to be writing a research paper or performing personal research. Commercial transactions associated with the query are likely to be minimal. In contrast, the commercial value of a search using the phrase "auto insurance" is likely to be significant. Users entering the second phrase may be potential auto insurance customers. Consequently, there is a large incentive for insurers to optimize their web sites, either legitimately or by cloaking, to respond to "auto insurance." Terms or phrases that are more likely to result in commercial transactions resulting in significant financial revenue are much more likely to be targeted for web spam.

This relationship between commercial viability of terms and probability that web pages associated with such terms are web spam can be utilized to assist in detecting web spam. More particularly, terms associated with a particular web page can be analyzed for commercial value. The greater the commercial value of the associated terms, the greater the probability that the web page is web spam.

Referring now to FIG. 1, a system 100 that facilitates detection of web spam or cloaked web pages is illustrated. The system 100 can determine the likelihood that a web page or set of web pages is cloaked based at least in part upon the value of terms associated with a web page. Terms associated with a web page can include search terms that would cause a search engine to return the web page in the set of search results. In addition, associated terms can include differences in terms included within a copy of the web page obtained by a browser and a copy of the web page obtained by a search engine crawler.

The system 100 can include a term analysis component 102 that evaluates a search term or set of terms and determines a measure or term score (e.g., a number or classification) that reflects the value of the term. Here, a term includes a word, a name, an identifier or any other data that can be utilized to locate a web page. In addition, the term analysis component 102 can evaluate sets of terms (e.g., combinations, permutations and phrases). The term score can be expressed as a score (e.g., integer or floating point number), a classification (e.g. high, medium and low value) and the like.

The system 100 can include a page analysis component 104 that can determine the relative likelihood or probability that one or more web pages are cloaked. The page analysis component 104 can provide the term analysis component 102 with one or more terms associated with or related to a web page. In addition to content of the web page, the page analysis component 104 can analyze related terms such as "anchor text" associated with the page. Anchor text refers to text within other web pages containing a hyperlink to the web page. The term analysis component 102 can evaluate the term or terms and provide a term score or other measure of commercial value to the page analysis component 104. The page analysis component 104 can prioritize pages for further analysis or identify a page as web spam based at least in part upon term scores of terms associated with web pages.

Figure 2:
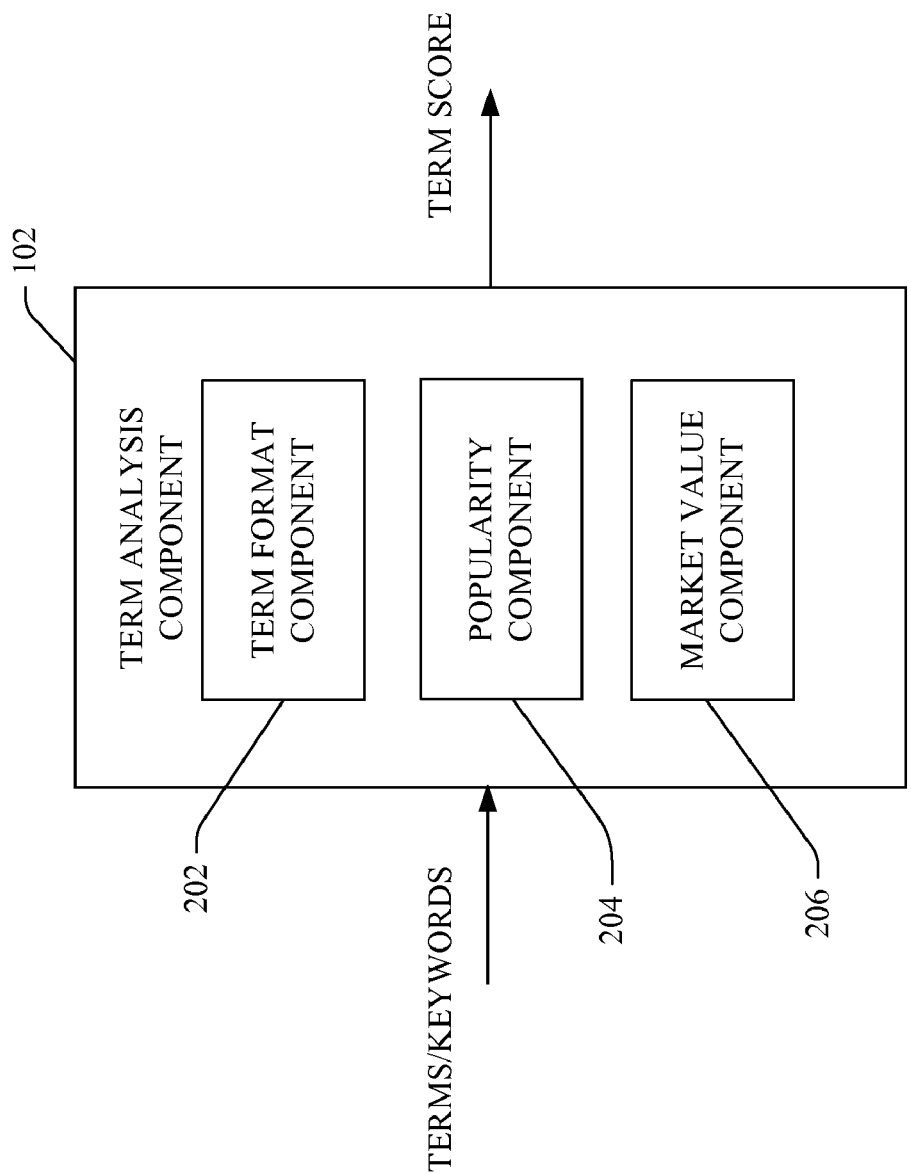
FIG. 2 is a block diagram of a system that evaluates search terms based upon popularity and/or market value in accordance with an aspect of the subject matter disclosed herein.

Referring now to FIG. 2, a more detailed illustration of a term analysis component 102 is depicted. The term analysis component 102 can include a term format component 202 that can parse, format or combine terms or phrases for analysis. After terms are properly formatted, a term or set of terms can be evaluated to determine a term score that reflects value of the term or terms.

Term value can be measured using a variety of metrics. For instance, popularity can be indicative of value of terms. Typically, the more users utilize a search term, the greater the traffic to the pages within the search results and the greater the value of the term. In particular, popularity of a term or terms can be proportional to the frequency of occurrence of a term or search query. Most major search engines publish the most popular search queries for a time period. For instance, many search engines disclose the top ten search queries for a day, a month or even a year. In addition, a search engine is likely to maintain query logs detailing popular searches. Such information can be utilized to compute the relative popularity of terms. The term analysis component 102 can include a popularity component 204 that can determine the relative popularity of a term or terms.

Value of terms can also be measured based upon market value or advertising monetization of terms. Although popularity may provide a general indication of commercial value, data regarding market value or monetization can provide additional information. For example, certain terms may have a high advertising monetization value without being particularly popular. Certain terms may be used infrequently; however, users who utilize such search terms can be particularly valuable to advertisers. In particular, terms that refer to certain illnesses that are the subject of class action or personal injury lawsuits may have a high market value. Such terms may be used infrequently, but law firms involved in those legal suits are anxious to contact potential clients. The term analysis component 102 can include a market value component 206 that can generate a market value or advertisement monetization value indicative of term value. In particular, advertisement monetization value can be based upon the advertising information associated with a term.

The advertising market for terms or keywords is complex. Typically, search engines sell online advertising through an auction process where advertisers bid for specific keywords and phrases. Web page results generally include both the links most relevant to the query and sponsored links (e.g., paid advertisements). Presentation of results on the web page allows users to distinguish advertisements from actual search results. The advertisements presented are dependent upon the search query. If a user selects a sponsored link, he or she is sent to the advertiser's web page. The user click can constitute a referral to the advertiser from the search engine and the advertiser may pay the search engine a fee for referring users (e.g., "pay-per-click" pricing).

The number of advertisements delivered in response to a query is limited and desirability of positions may vary. Generally, advertisers prefer that their sponsored links appear at the top, left portion of the page. Fees can vary based upon search terms and upon position of results on a page. Many search engines utilize an auction system, such as a Generalized Second Price (GSP) auction to allocate positions to advertisers.

In a GSP auction, advertisers submit bids stating their maximum willingness to pay for a click for a specific term or keyword. When a user enters a keyword, he receives search results along with sponsored links, the latter shown in decreasing order based upon received bids. In particular, the advertisement with the highest bid may be displayed at the top of the page; the advertisement with the next highest bid may be displayed at the position second from the top and so forth. If a user selects a sponsored link, the advertiser is charged the amount of the next lower bid. For example, if the top-most sponsored link were selected, the advertiser would be charged the amount of the bid for the sponsored link in the second position. If only one sponsored link were displayed per page, GSP would be equivalent to a standard second price, or Vickrey-Clarke-Groves (VCG) auction.

Many popular search engines utilize a variation of the GSP auction. Frequently, advertisers' bid price is combined with expected click through rate (CTR) to compute an expected monetization score. In the variation, auctions are based upon the expected monetization score instead of bids and sponsored links are presented in decreasing order of expected monetization scores. Advertisers can bid for a single keyword, a keyword and additional search terms or a phrase. The bidding process can be blind or open, such that bidder's bid price and identity may or may not be disclosed to other bidders.

Search engines provide multiple types of matching between queries and bid keywords or terms (e.g., broad match, phrase match, exact match and excluded keywords). Broad match can occur when a query contains all keywords within the bid in any order. Bid keywords can also be expanded to include plurals and relevant variations. Phrase match can occur when all bid keywords appear in the search query in the prescribed order. Broad and phrase match can allow for extraneous terms not appearing within the set of bid keywords. Exact matches may occur only when the search query matches the bid phrase exactly. Occurrence of excluded keywords would negate matches. Matching sponsored links can be ranked based upon relevance, monetizability or market value, and the like.

The market value of terms associated with a web page (e.g. page content and/or search terms that locate the web page) can be computed in numerous ways. Market value for terms can be proportional to the total revenue generated by sponsored links provided along side the search results for a search query utilizing the terms during a specified time period. Alternatively, market value can be based upon number of user clicks for links served alongside search results, the maximum bid price for the keywords, maximum amount that was paid within the specified time period as well as many other variations. Many major search engines serve online ads and track usage. Such logs can be mined to obtain popularity and monetizability statistics for search queries.

The term score can be equal to popularity of the term(s) or market value. Alternatively, commercial value or term score can be a function of the combined popularity and market value. The term score can be provided in any suitable format.

Figure 3:
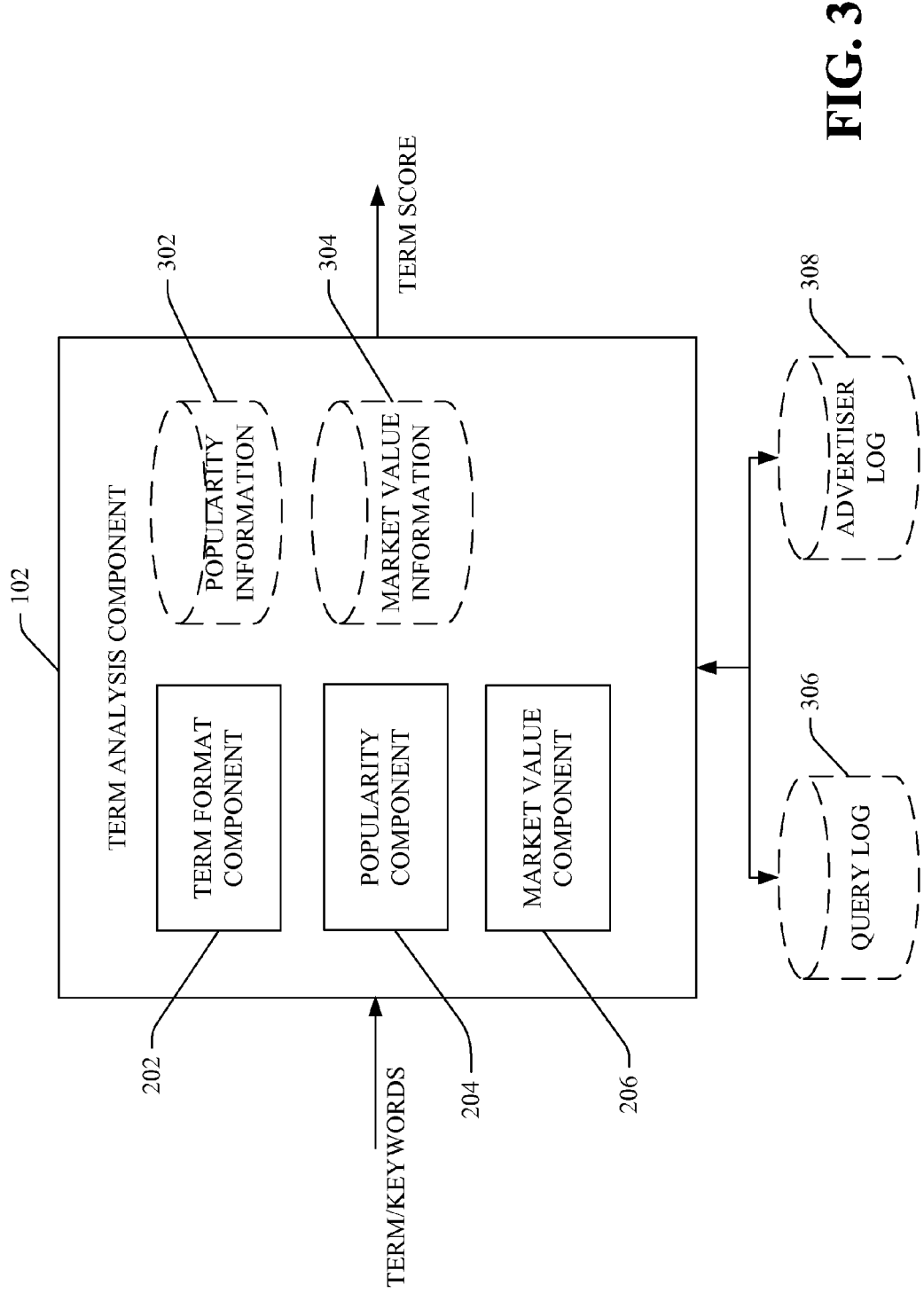
FIG. 3 is a more detailed block diagram of a system that evaluates search terms based upon popularity and/or market value in accordance with an aspect of the subject matter disclosed herein.

Turning now to FIG. 3, another aspect of the term analysis component 102 is illustrated. The term analysis component 102 can include popularity information 302 and market value information 304. Popularity information 302 can include data from which popularity of terms can be derived. For example, popularity information 302 can include data regarding frequency of occurrence of terms within search queries for a specified period of time. Popularity information 302 can be updated periodically or dynamically. Similarly, market value information 304 can include data from which market values of terms can be derived. For instance, market value information 304 can include, but is not limited to, data regarding total advertising revenue associated with a term, number of bidders competing for search terms, the amount of bids and the like. Market value information 304 can also be updated periodically or dynamically. Popularity and market value information can be obtained in substantially real-time and/or from a local and/or remote data store.

The popularity data and market value data can be obtained from a search engine query log 306 and an advertiser log 308, respectively. Many search engines maintain logs or data stores that include information regarding popular search queries. Such information can be utilized to populate popularity information 302. In addition, search engines generally maintain advertising information for accounting purposes. Information from the advertiser log 308 can be utilized to populate market value information 304. Alternatively, popularity and market value information can be obtained directly from the query log 306 and advertiser log 308 as required to determine popularity and market values.

Figure 4:
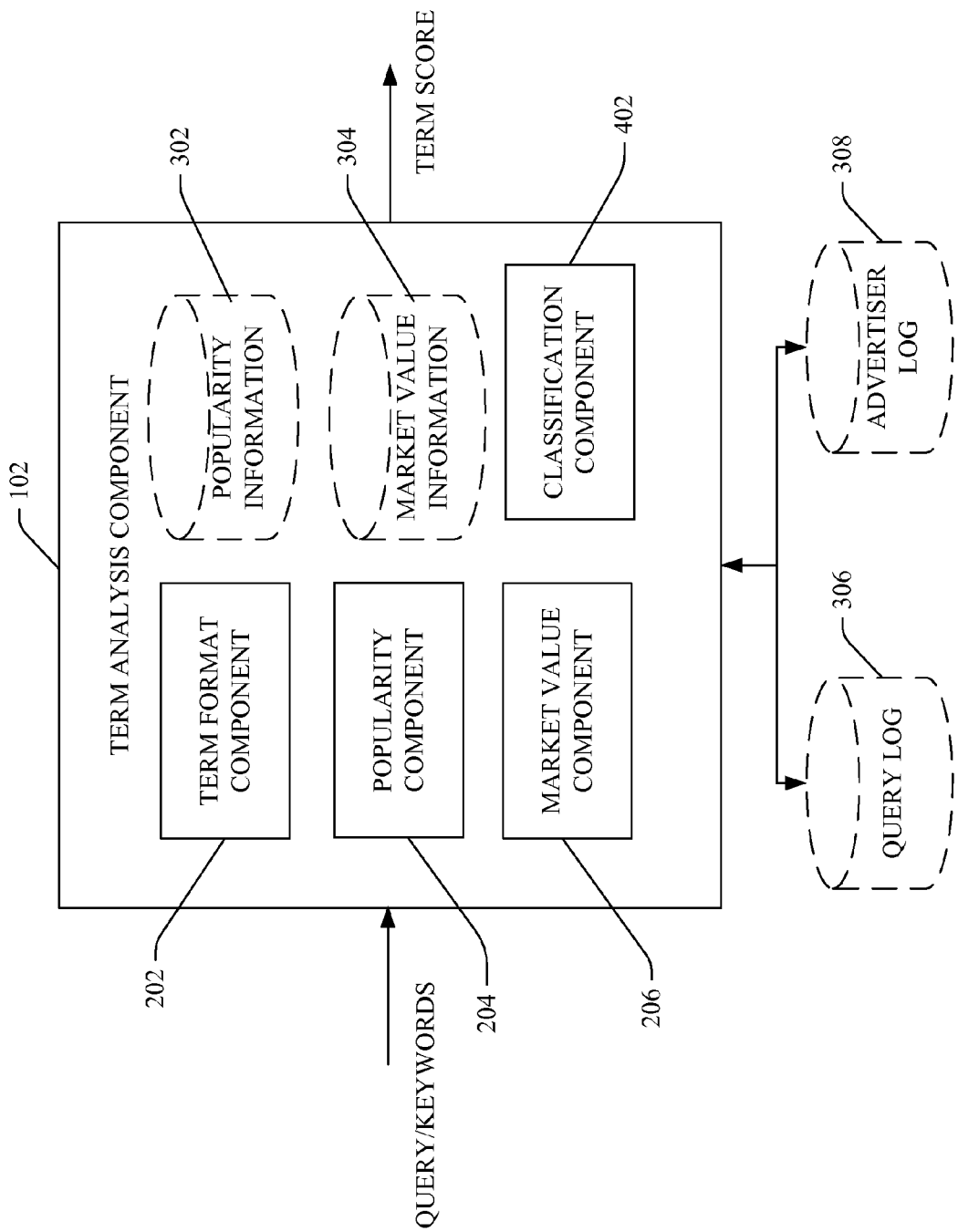
FIG. 4 is a block diagram of a system that evaluates value of search terms in accordance with an aspect of the subject matter disclosed herein.

Referring now to FIG. 4, the term analysis component 102 can include a classification component 402 capable of classifying the term score or commercial value. For example, the term score can be classified as low, medium and high, indicating the commercial value of the term and probability that the term will attract web spammers. Other systems of classification (e.g. likely, unlikely) can be utilized to categorize term scores. Any number of threshold values can be used in classification. The classification component 402 can compare term scores based upon popularity, market value or any combination thereof.

The classification can be provided with or in place of the actual term scores. The classification of term scores can assist users in eliminating pages that are unlikely to be spammed and identifying pages for further review. Thresholds can be predetermined and may be adjusted to fine tune the term analysis and assist in accurate identification of web spam.

Figure 5:
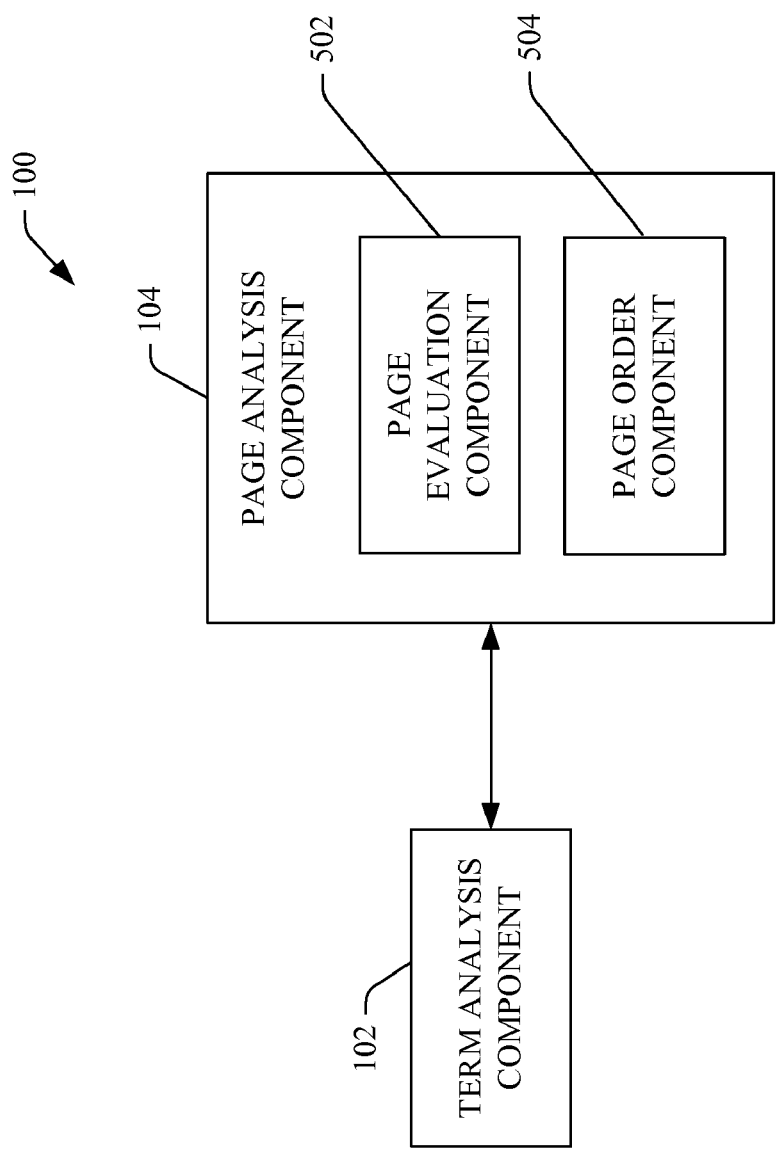
FIG. 5 is a block diagram of a system that evaluates a web page in accordance with an aspect of the subject matter disclosed herein.

Referring now to FIG. 5, an aspect of the system 100 that facilitates detection of web spam or cloaked web pages is illustrated. The page analysis component 104 can include a page evaluation component 502 that is capable of evaluating a particular web page and determining the probability that the web page is web spam. More particularly, the page evaluation component 502 can determine difference in terms between versions of web pages obtained by browsers and crawlers. Commercial values associated with such terms can be obtained from the term analysis component 102. The page evaluation component 502 generates a page score indicative of the probability that the web page is cloaked based upon the term difference analysis and the commercial value of differing terms. This page score can be compared to one or more threshold values to identify web spam automatically.

The page analysis component 104 can also include a page order component 504 that orders or prioritizes a set of web pages. Web page order can be based at least in part upon term scores for terms associated with the web pages. Terms associated with the web pages can include search terms utilized to locate the web pages. For example, the set of web pages may be defined based upon search results from the most popular queries over a specified period of time. The search engine can associate the search query terms and web pages delivered in response to the search query. Accordingly, each web page can be associated with query terms utilized to retrieve the page. Web pages can be ordered based upon term scores for related search terms. The ordered pages can be analyzed further manually, by the page evaluation component 502 or using another method for automatic cloak detection to identify cloaked pages.

Figure 6:
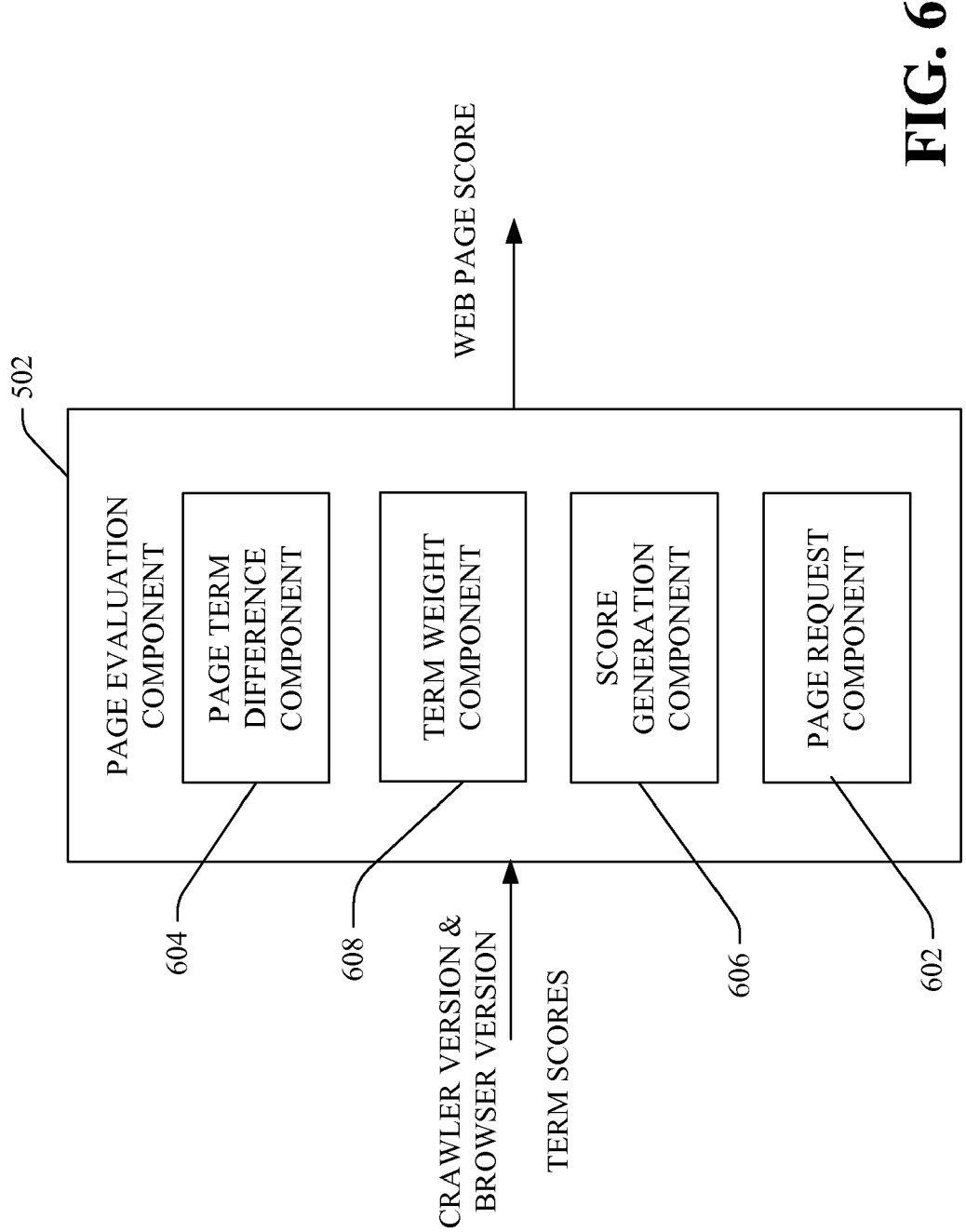
FIG. 6 is a block diagram of an aspect of the page evaluation component in accordance with an aspect of the subject matter disclosed herein.

Referring now to FIG. 6, an aspect of the page evaluation component 502 is illustrated in more detail. The page evaluation component 502 can include a page request component 602 that can obtain multiple versions of a web page. For instance, the page request component 602 can obtain one or more copies of a web page as retrieved by a user and one or more copies of the web page as retrieved by a crawler or bot, referred to as browser versions and crawler versions, respectively. A page term difference component 604 can analyze the different versions of the web page to facilitate identification of cloaked web pages.

There are many legitimate reasons for differences between web page versions. For example, a search engine crawler may be unable to utilize JavaScript associated with a page. Therefore, web servers may not provide JavaScript to search engine crawlers to minimize bandwidth required in provisioning of pages. Additionally, search engine crawlers may be unable to utilize streaming video or audio associated with pages. Such data may not be provided with crawler versions of the web page. In addition, certain pages are individualized for users or advertisements on the web page may update with each download. In such cases browser versions of the same page may differ.

Generally, search engines evaluate pages for search purposes based upon text associated with a page. Spammers may include text within the crawler version designed to ensure that the cloaked page will be returned in search results based upon specific keywords or terms. Cloaking behavior that is aimed at manipulating the search engine is referred to as semantic cloaking. Syntactic cloaking implies that different content is served to automated crawlers as opposed to web browsers, but different content may not be provided to every visitor. Dynamic web pages that serve different web pages to every visitor would not be considered to be syntactically cloaking, but may be semantically cloaking. The page evaluation component 502 may facilitate identification of both syntactic and semantic cloaked web pages.

In term difference analysis, differences in text terms between browser versions and crawler versions can be analyzed to determine likelihood of cloaking for a particular web page. Numerous algorithms can be utilized to perform term difference analysis. Frequently, non-cloaked pages can be identified based upon simple HTML string comparisons, HTML to text conversion and text string comparisons. For example, identical HTML, or converted text streams can be identified efficiently to eliminate non-cloaking web pages. Frequently, versions of the web pages are treated as a "bag of words." All formatting can be removed from the web pages to derive a list of words or terms. Terms can be shuffled, such that term order is irrelevant. A score generation component 606 can analyze term difference information provided by the page term difference component 604 to determine a page or cloaking score reflects the probability that the web page is cloaked.

The page term difference component 604 can also utilize normalized term frequency difference (NTFD) to generate term difference information. The page term difference component 604 can compute the NTFD for two web pages as follows:

$$D(T_1, T_2) \frac{|(T_1 \setminus T_2) \cup (T_2 \setminus T_1)|}{|(T_1 \cup T_2)|} = 1 - 2\frac{|(T_1 \cap T_2)|}{|(T_1 \cup T_2)|}$$

Here, $T_1$ and $T_2$ are the sets of terms from the two web pages (e.g. a crawler version and a browser version of the same web page) after conversion and tokenization. $T_1$ and $T_2$ can contain many repeated terms. The set cardinality operator is represented by |.| within the equation. All set operations are extended to work with sets with repeated terms. The set of terms present in the first page, but not the second page is represented by $(T_1 \setminus T_2)$. The set of terms present in the second page, but not the first page is represented by $(T_2 \setminus T_1)$. $(T_1 \cup T_2)$ represents the union or aggregation of terms in both pages. Normalization based upon the union $(T_1 \cup T_2)$ reduces any bias that stems from the size of the web pages. The NFTD score for any two web pages will be between zero and one. Essentially, larger web pages may have more differences in terms than smaller web pages while receiving identical cloaking scores. In general, NTDF is symmetric:

$$D(T_1, T_2) = D(T_2, T_1)$$

The NTDF is relatively simple to compute and disregards semantic and layout structure of page content.

NTFD differs from scores obtained using traditional bag of words methods. Traditionally, bag of words methods parse an HTML into terms and count each unique term only once, regardless of the number of times the term appears within the paper. Furthermore, traditional bag of word methods do not generally normalize the term set difference, resulting in a potential bias against large web pages.

The page term difference component 604 can also utilize page sections during term difference computations. As described above, all sections of the web page (e.g. navigation, header, footer, advertisements, etc.) are treated equally. However, differences in particular page sections may be more relevant than others. For example, differences in title may be more important than differences in an advertisement or footnote. Accordingly, terms may be weighted based upon their location within pages.

The score generation component 606 can utilize term difference scores, such as NTFD scores, generated based upon multiple web page versions to generate a page or cloaking score. For example, four copies of the web page denoted by $C_1$, $B_1$, $C_2$ and $B_2$ can be downloaded by the page request component 602. Here, $C_1$ and $C_2$ are obtained by mimicking a web crawler (e.g., MSNBot) and $B_1$ and $B_2$ are obtained using a web browser (e.g., Internet Explorer). The page term difference component 604 can utilize the four copies to determine term difference scores.

The score generation component 606 can generate a page score S, where S can be computed as follows:

$$S = \frac{\Delta_D}{\Delta_S}$$

Here, $\Delta_D$ is the smaller of the NTFD scores for cross-pairs of web pages, where cross pairs refers to web page pairs in which one web page is obtained by mimicking a search engine crawler and the other is obtained by a browser (e.g., $(C_1, B_1)$ and $(C_2, B_2)$). $\Delta_S$ is the larger of the NTFD scores for the two similar-pairs of web pages, where similar pairs refers to web page pairs in which both pages are retrieved in the same manner (e.g. $(C_1, C_2)$ and $(B_1, B_2)$). Mathematically, this can be expressed as follows:

$$\Delta_D = \min(D(C_1, B_1), D(C_2, B_2))$$

$$\Delta_S = \max(D(C_1, C_2), D(B_1, B_2))$$

Although, this example utilizes NFTD scores in calculation of page scores, other term frequency difference algorithms can be utilized. This particular page score calculation is relatively conservative in labeling pages as cloaked, but is more aggressive than simply labeling all non-syntactic cloaking as non-cloaking. Alternatively, the mean of the term frequency difference scores can be used rather than min and max to increase the aggressiveness of the page score. Certain exceptions can be utilized to avoid page score computations, which would require division by zero. For example, if $\Delta_D=0$ and $\Delta_S=0$, the page can be marked as non-cloaked and S=0. If $\Delta_D>0$ and $\Delta_S=0$, the page can be identified as cloaked (S=∞).

Once the score generation component 606 has computed a page score for a web page, dynamic web pages can be identified as follows:

$$0 < S < \infty \rightarrow \text{dynamic URLs}$$

A page score of zero would indicate that there was no difference in the cross-pair pages and no page cloaking occurred. Conversely, a page score that approaches infinity would indicate that similar pair pages are identical and therefore the page is not dynamic.

A threshold test can be utilized to identify the page as cloaked:

$$0 < t < S \rightarrow \text{cloaking spam}$$

Here, t (0<t<∞) is a predetermined threshold that can be utilized to identify a page as web spam. Alternatively, multiple thresholds can be used to classify likelihood that the page is web spam (e.g., high, medium and low).

The page evaluation component 502 can also include a term weight component 608 that generates a weight or set of weights based upon commercial value of term differences among web pages. The generated weights can be used in the computation of page scores. Generally, if the terms that appear in the web crawler version, but not the browser version are commercially valuable, the page is more likely to be web spam.

The page term difference component 604 can provide the term weight component 608 with information regarding the term differences among different versions of the web page. The term weight component 608 can obtain information regarding the commercial value or term score of the differing terms. For example, the term weight component can provide the terms to a term analysis component as illustrated in FIGS. 1 through 4. These term scores can be used during term frequency difference computations to emphasize valuable terms. Alternatively, term scores can be utilized by the score generation component 606 to adjust page scores to reflect the effect of commercial value on the probability that a web page is cloaked.

Figure 7:
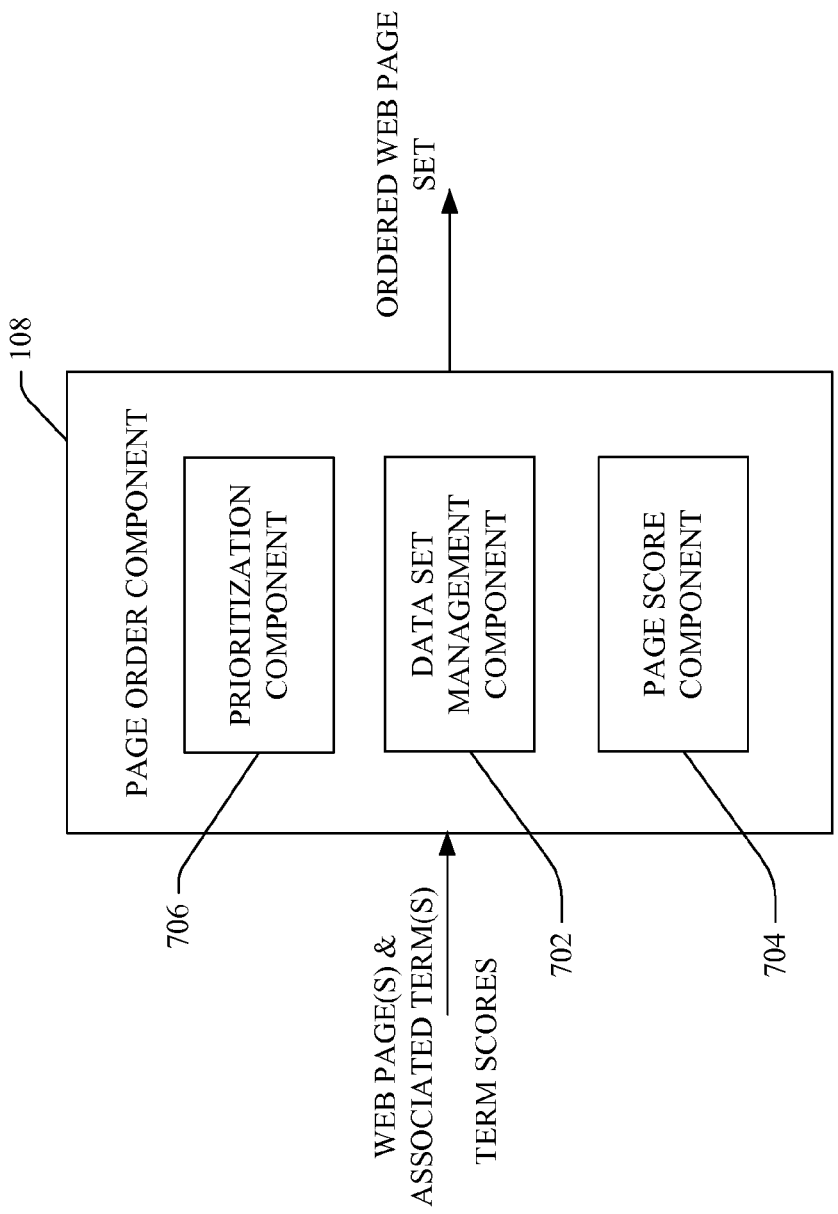
FIG. 7 is a block diagram of a component that prioritizes web pages for evaluation in accordance with an aspect of the subject matter disclosed herein

Referring now to FIG. 7, a more detailed depiction of the page order component 504 is illustrated. The page order component 504 can prioritize or order a set of web pages based at least in part upon term scores of terms associated or related to the web pages. Frequently, search engines employ individuals to manually review or scrub web pages to remove web spam. The set of web pages can be obtained and ordered to facilitate further analysis and identification of web spam.

A data set management component 702 can obtain the web page set. The web pages may be received or requested based upon information from a search query log. For example, search results for the top most requested search queries can be included within the web page set.

A page score component 704 can identify terms associated with each web page within the set of web pages. In addition, the page score component 704 can obtain term scores for each term associated with a web page and generate a page score. The page score for a web page can be based upon an aggregation of term scores for terms related to the web page. For example, the page score can be equal to the maximum term score or an average term score for the web page.

The page order component 504 can include a prioritization component 706 that can organize or classify web pages based upon the page scores. The set of web pages can be ordered by page score. Alternatively, one or more thresholds can be applied to organize the pages for further evaluation.

The aforementioned systems have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Additionally, it should be noted that one or more components may be combined into a single component providing aggregate functionality or divided into several sub-components. The components may also interact with one or more other components not specifically described herein but known by those of skill in the art.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 8:
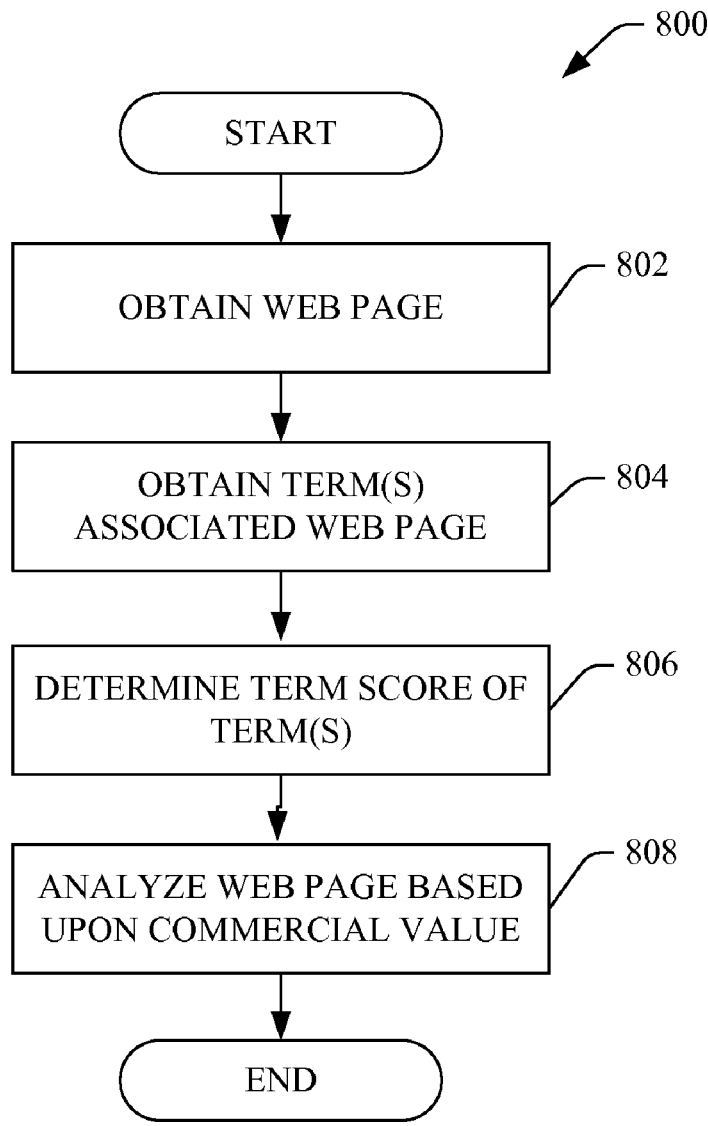
FIG. 8 illustrates a methodology for facilitating detection a cloaked web page in accordance with an aspect of the subject matter disclosed herein.

Referring now to FIG. 8, a methodology 800 for facilitating detection of web spam is illustrated. Beginning at 802, at least one web page is obtained. Terms associated with the web page can be obtained at 804. The terms may be provided along with the web page. For instance, the associated terms can include search query terms used to locate the web page. Alternatively, the associated terms can be based upon differences between copies of the web page. For example, terms can be identified based upon differences between a browser version and a crawler version of the web page.

The terms related to the web page can be analyzed to determine a term score indicative of commercial value at 806. Commercial value can be computed using a variety of algorithms. Term score can be based upon popularity, market value or any combination thereof. At 808, the web page is analyzed based upon the commercial value of associated terms. Analysis can include computation of a page score that serves as a metric for the relative probability that the web page is cloaked. The page score can be utilized for a variety of purposes including automatic identification of cloaked pages and prioritization of web pages for further analysis.

Figure 9:
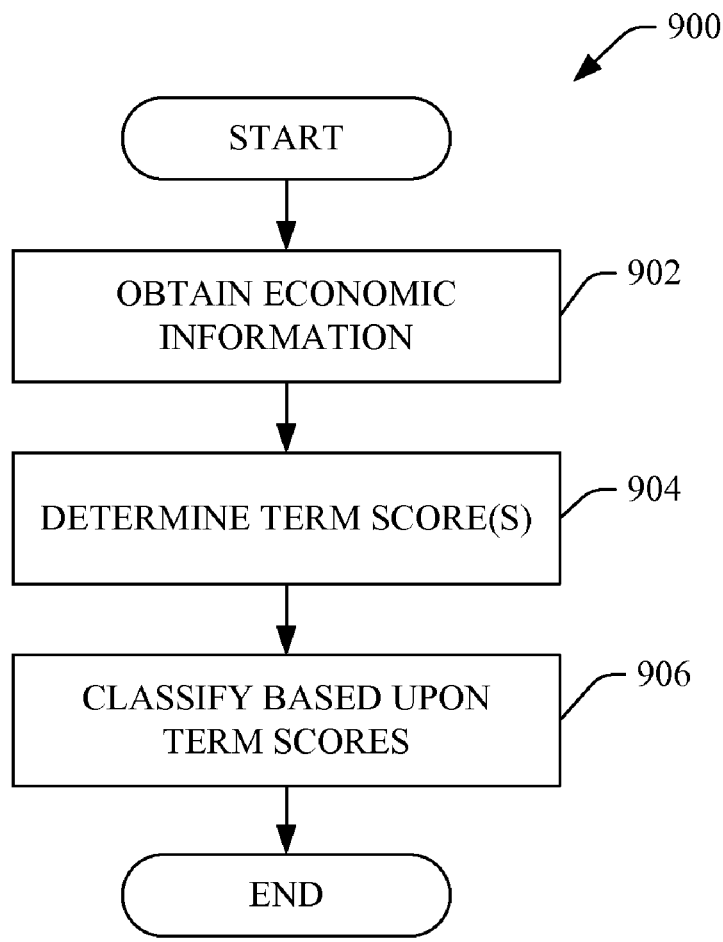
FIG. 9 illustrates a methodology for analyzing value of terms in accordance with an aspect of the subject matter disclosed herein.

FIG. 9 illustrates a methodology 900 for analyzing commercial value of terms. At 902, term information can be obtained. The term information can include indicia of the economic value of the term or combination of terms. For example, term information can include market value information regarding advertising fees, bid prices, advertising revenue and the like. Alternatively, term information can include popularity data, such as frequency with which the term is utilized in search queries. Such information can be obtained from search engine query logs and advertising logs. At 904, a term score can be generated based upon the collected term information. The term score can be based upon popularity, market value or a combination of popularity and market value.

Generally, the greater the value of the terms, the greater the incentive for spammers to generate web spam. At 906, search terms can be classified based upon comparison of the term score to one or more thresholds. For example, terms or combinations of terms can be identified as unlikely to result in web spam, likely to result in web spam or highly likely to result in web spam.

Figure 10:
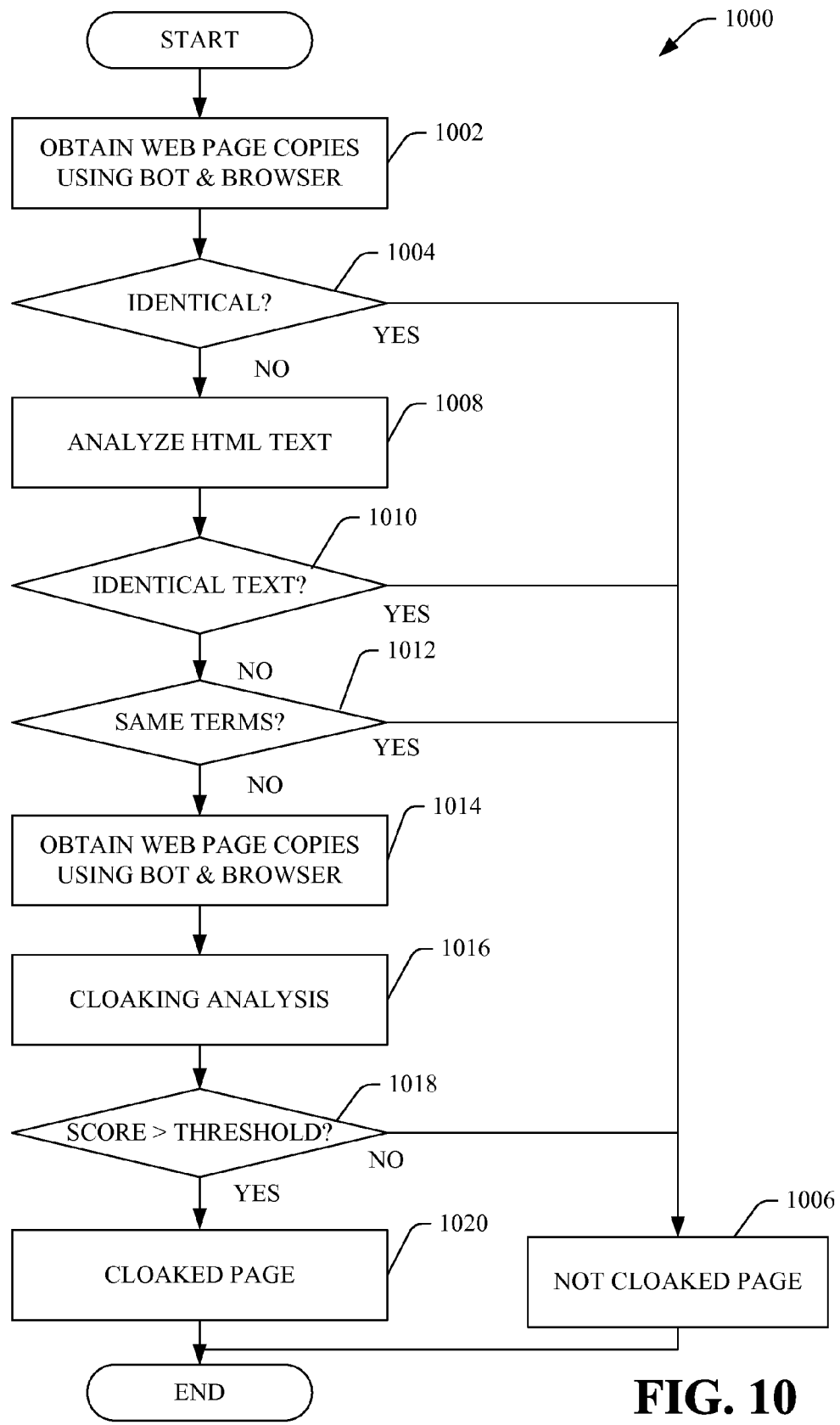
FIG. 10 illustrates a methodology for detecting a cloaked page in accordance with an aspect of the subject matter disclosed herein.

FIG. 10 illustrates a methodology 1000 for detecting a cloaked page in accordance with an aspect of the subject matter disclosed herein. At 1002, two copies of a web page can be obtained. The first copy can be obtained by mimicking a browser and the second copy can be obtained by mimicking a search engine crawler or bot. At 1004, a determination is be made as to whether the first copy is identical to the second copy. If the copies are identical, there has been no attempt to manipulate the search engine crawler, and the web page is identified as not cloaked at 1006. If the copies are not identical, the HTML text is analyzed at 1008.

HTML analysis can include a simple string comparison. HTML analysis can also include conversion to plain text and tokenization (removal of white space). At 1010, a determination is made as to whether the resulting text is identical. If the text is identical, there has been no attempt to manipulate the search engine crawler and the web page is identified as not cloaked at 1006. If the text is not identical, a determination is made as to whether the same terms are utilized in the two copies at 1012. If yes, the web page is identified as not cloaked at 1006. If no, a third and fourth copy of the web page are obtained at 1014. The third copy can be obtained by mimicking a browser and the fourth copy can be obtained by mimicking a search engine crawler. The third and fourth copy can also be converted to text and term frequencies calculated.

At 1016, the web page copies and terms can be analyzed to generate a page or cloaking score that reflects the likelihood that the web page is web spam. Cloaking analysis is discussed in greater detail with respect to FIG. 11. At 1018, a determination can be made as to whether the page score is greater than a predetermined threshold value. If no, the web page is identified as not cloaked at 1006. If yes, the page is identified as cloaked at 1020. Alternatively, a set of thresholds can be used to classify the page. For example, cloaking probability for a page could be identified as low, medium or high.

Figure 11:
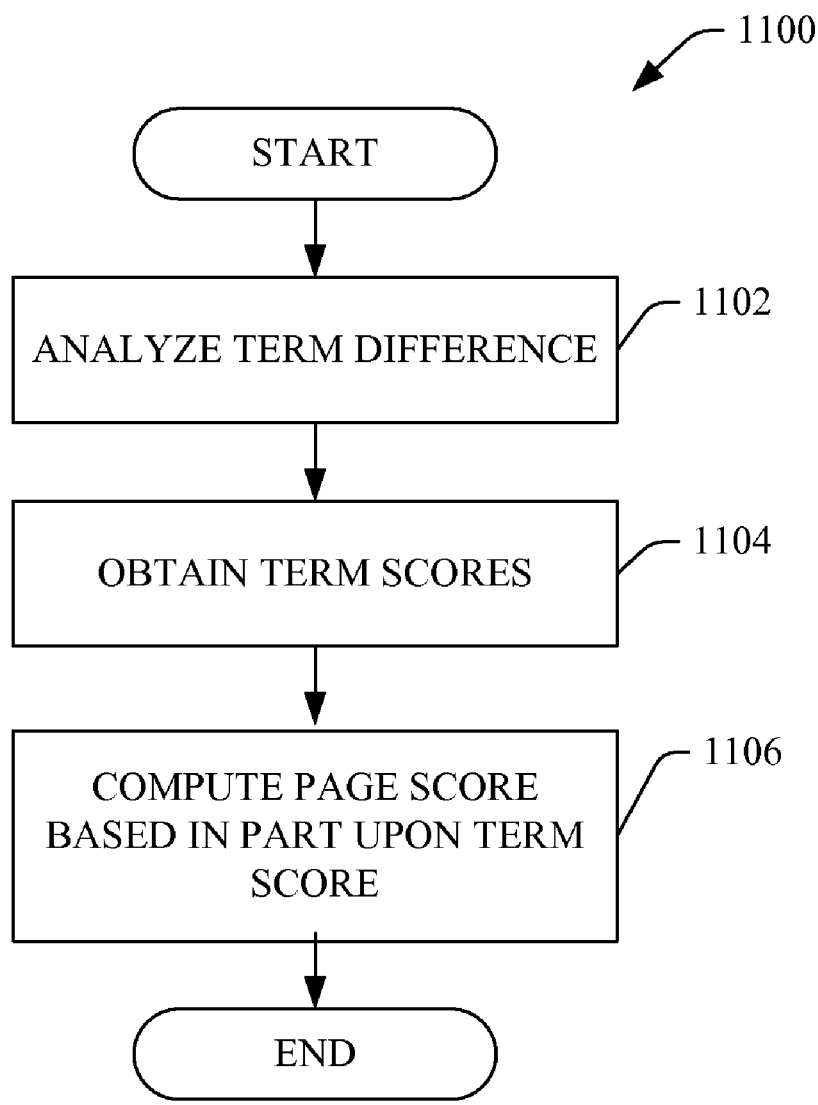
FIG. 11 illustrates a methodology for facilitating cloaking analysis in accordance with an aspect of the subject matter disclosed herein.

FIG. 11 illustrates a methodology 1100 for facilitating cloaking analysis. At 1102, term frequency difference between copies of the web page can be analyzed. A variety of algorithms can be utilized to evaluate term frequency difference including traditional bag of words methods as well as normalized term frequency difference, as described above.

At 1104, a term score indicative of term value can be obtained for each term or combination of terms identified during term analysis. Identified terms can include terms that appear in a crawler version of the web page, but not the web browser version of the web page. Such terms can be utilized to manipulate the search engine and the term score can indicate the likelihood that the associated web page is web spam.

At 1106, a page score can be computed that reflects the probability that the web page is web spam. The page score can be based upon the term frequency differences as well as the term scores associated with a page. Additionally, web page scores can be used to classify web pages (e.g., low, medium and high probability of cloaking).

Figure 12:
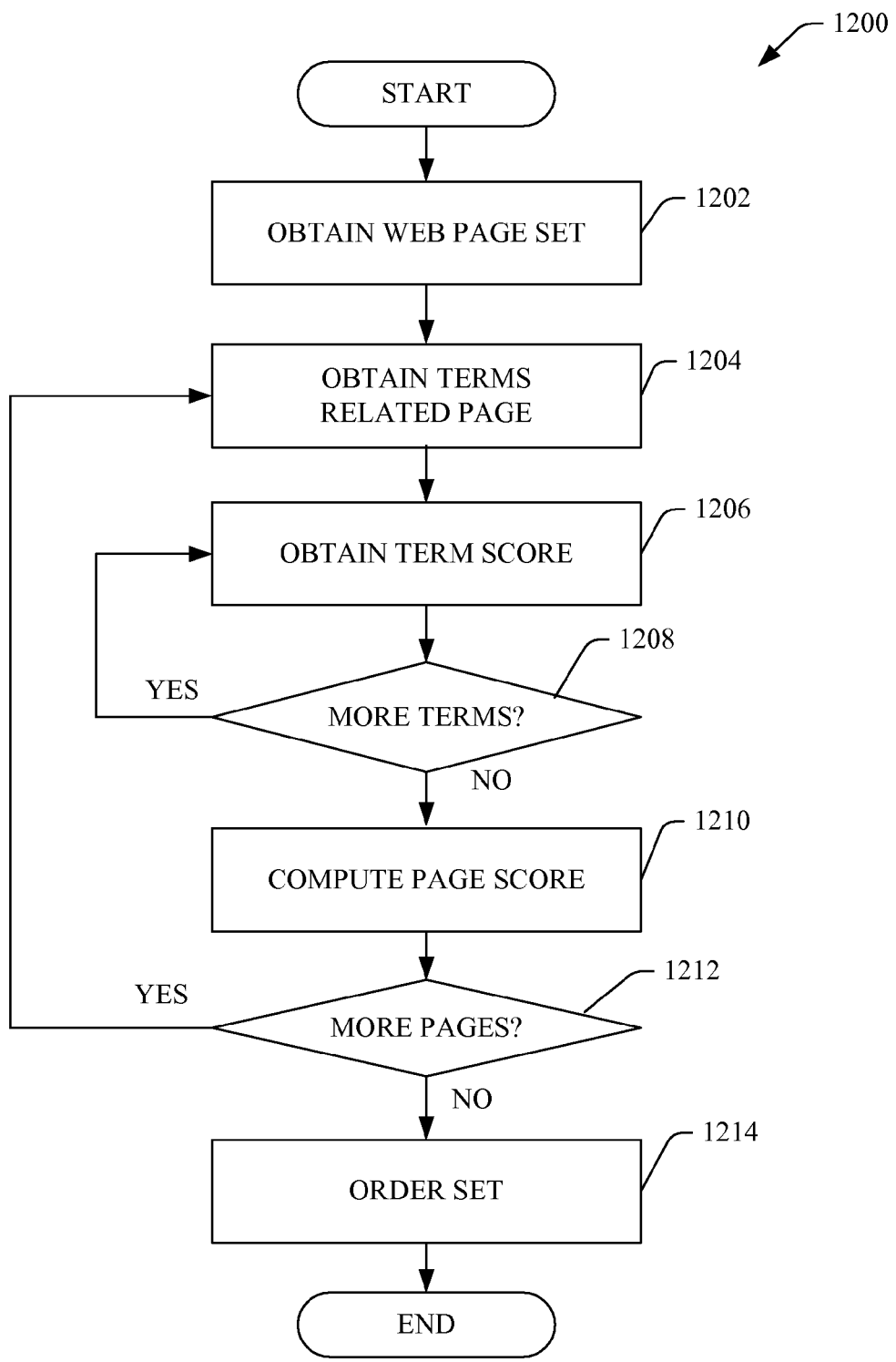
FIG. 12 illustrates a methodology for prioritizing a set of web pages in accordance with an aspect of the subject matter disclosed herein.

FIG. 12 illustrates a methodology 1200 for prioritizing a set of web pages. At 1202, a set of web pages is obtained. For example, the set can include the top 20 search results for each of the top 1000 search queries for the previous day. The related or associated terms for a web page are obtained at 1204. Related terms can include search queries utilized to retrieve the web pages. Alternatively, related terms can based upon term difference between a browser version and a crawler version of the web page.

At 1206, a term score can be obtained for a term associated with a web page. The term score can be based upon popularity, market value, a combination thereof or any other indicia of value. A determination is made at 1208 as to whether there are additional terms or combinations of terms associated with the page for which a term score is to be generated. If yes, the process returns to 1206, where a term score is obtained for the next term related to the web page. If no, at 1210 a page score based at least in part upon term values is generated. At 1212, a determination is made as to whether there are additional web pages to evaluate. If yes, related terms are obtained for the next web page at 1204. If no, the set of web pages can be ordered based upon the generated page score at 1214. Ordering can include organizing the web pages by page score and/or classifying the pages based upon probability of web spam.

Figure 15:
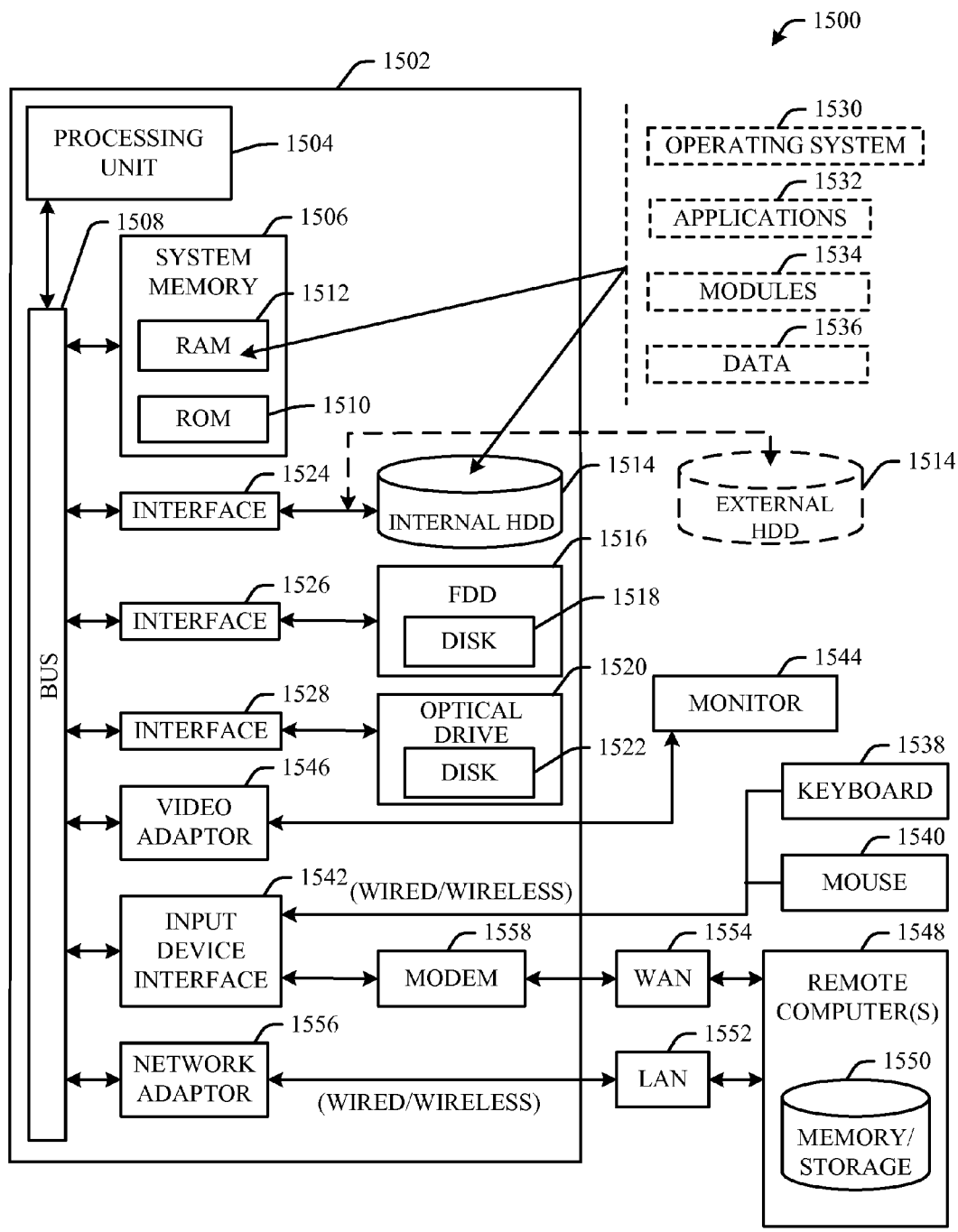
FIG. 15 is a schematic block diagram illustrating a suitable operating environment.
Figure 16:
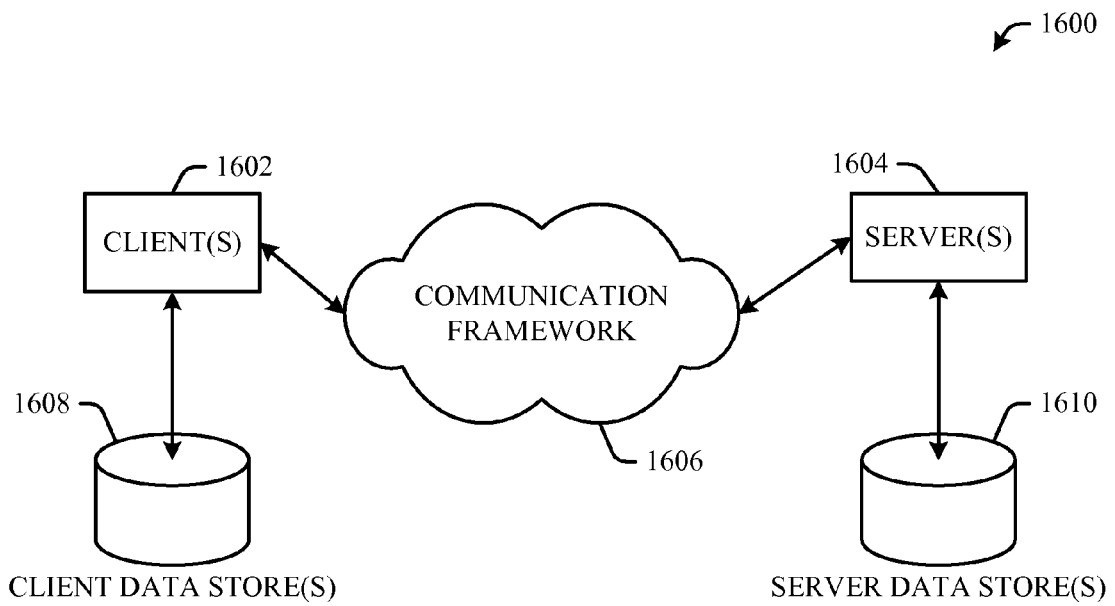
FIG. 16 is a schematic block diagram of a sample-computing environment.

Turning now to FIGS. 15 and 16, experiments were conducted utilizing the cloaking detection systems and methods described herein. In the experiments, two lists of 5000 queries were used. The first list included the top 5000 most popular search queries computed over one month. The second list included the top 5000 most monetizable search queries over a single day. For purposes of the experiments, monetizabilty of a specific query was proportional to the total revenue generated by sponsored ads served alongside the search results (for that query) during a specific time period. The first list was obtained by processing search query logs, while the latter list was obtained by processing advertising logs. Both logs were obtained from a search engine (e.g., MSN search engine). The two lists included 826 queries (17% of the total queries) that were duplicated between the lists.

A set of URLs or web pages were obtained based upon the query lists. For each query, the top 200 search results were obtained from three separate search engines (e.g., Google, MSN Search, and Ask.com). For each search engine, only one search was performed for each unique query. Each query produced 600 search result URLs which typically contain several duplicates. Each set of 5000 queries generated 3 million URLs. Overall, the list of the 5000 most popular queries generated 1.49 million unique URLs (referred to herein as the popular set), and the list of the top 5000 most monetizable queries generated 1.28 million unique URLs (referred to herein as the monetizable set). Each unique URL was processed only once.

To analyze pages for cloaking, for each URL, up to four copies of the Web page, denoted by $C_1$, $B_1$, $C_2$, and $B_2$, are downloaded and compared. As discussed with respect to FIG. 10, there are several stages where it can be determined that a page is not cloaked. For example, during the download process, many of the non-cloaked pages are detected through simple HTML string comparisons, HTML to text conversion, and text string comparisons. Normalized term frequency difference (NTFD) is subsequently used to compute a cloaking score and used to further reduce the set of possibly cloaked URLs. Finally, using labeled data, a threshold for the cloaking score is chosen to classify remaining URLs.

During the experiment, the first copy of the URL ($C_1$) was obtained by mimicking a popular Web crawler (e.g., MSN-Bot) and the second ($B_1$) was obtained using a common Web browser's (e.g., Internet Explorer) agent string. These first and second copies were checked for identical HTML content using a simple string comparison. If the first and second copies were identical, the URL was marked as not cloaked. About 70-75% of the URLs fell under this category. The HTML content for the remaining 25-30% was converted to plain text and directly compared using a simple string comparison. At this stage, about 13.5% of the URLs produced identical text streams and were marked as not-cloaked. The text streams were tokenized (using white space) and their term frequencies were computed. About 0.5% of the URLs produce identical term frequencies. The remaining URLs (about 12%) with differing text content were downloaded two more times to obtain a third ($C_2$) and a fourth ($B_2$) copy. The third and fourth copies were then converted to text and their term frequencies calculated. Note that at the end of the download process those URLs with only ($C_1$, $B_1$) pair of pages were not-cloaked (by definition). The remaining URLs had four copies ($C_1$, $B_1$, $C_2$, and $B_2$) and needed further processing.

Each of the copies ($C_1$, $B_1$, $C_2$, and $B_2$) was asynchronously crawled using different crawler threads. For example, all $C_1$ copies were crawled by the first crawler thread. Similarly, all $B_1$, $C_2$, and $B_2$ copies were crawled by the first browser thread, the second crawler thread, and the second browser thread, respectively. The ordering of initiating URLs downloads was the same for all four threads (with the exception of early out scenarios where URLs were skipped by the $C_2$, and $B_2$ threads).

In the event of a download failure, the download was reattempted once. URLs that failed download twice were dropped from analysis. For both the popular and monetizable query URL sets, less than 3% of the URLs failed to download. Overall, on average of about 2.1 downloads were performed per unique URL.

A simple normalized term frequency difference (NTFD) between the four copies was used in computing a cloaking score. Computation of NTFD and the cloaking score are described in detail above with respect to FIG. 6. Cloaked pages were identified by comparing the cloaking score to a threshold, t. For each of the URL sets (popular and monetizable) 2000 URLs were randomly sampled from the set of dynamic URLs and manually labeled as spam or no-spam.

Figure 13:
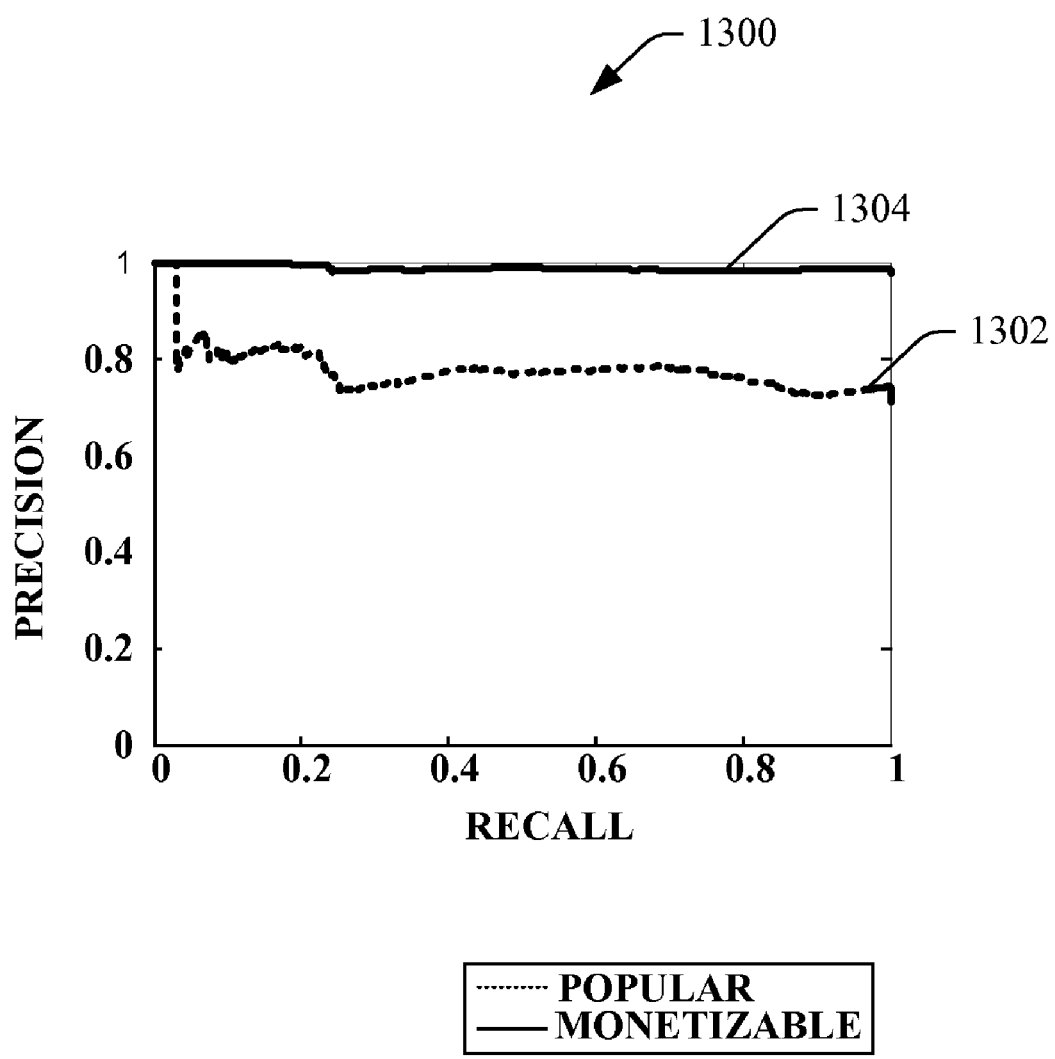
FIG. 13 depicts a graph illustrating precision and recall in cloaking detection.

Turning now to FIG. 13, a graph 1300 illustrating the trade off between precision and recall is depicted. Here, recall is indicative of the portion of cloaked pages identified, while precision reflects the accuracy or identified results. For instance, what portion of the pages identified as cloaked have been mistakenly identified. FIG. 13 shows the precision-recall curve for various values of the threshold t. The precision and recall values and their associated thresholds are also presented in Table 1 below. As illustrated by the line 1302 representing popular URLs and the line 1304 representing monetizable URLs, as the value of threshold t increases, recall gradually decreases. Precision starts out high at low values of recall and quickly reaches a final value around 75% for popular URLs and a value of 98.5% for monetizable URLs.

All three commonly used F-measures: $F_1$, $F_{0.5}$, and $F_2$, reach the highest value at a threshold of 0.0, where the recall is 100% and the precision is 73.12% and 98.54% for popular and monetizable URLs, respectively. Indicating that the cloaking score is an effective indicator of cloaking spam.

TABLE 1

Precision and Recall

| | Precision (threshold, t) | |
|---|---|---|
| Recall | Popular URLs | Monetizable URLs |
| 10 | 85.74 (19.93) | 100.00 (15.11) |
| 20 | 81.72 (1.98) | 99.91 (1.28) |
| 30 | 75.33 (1.10) | 98.77 (0.97) |
| 40 | 76.65 (0.94) | 98.56 (0.87) |
| 50 | 77.39 (0.78) | 98.79 (0.77) |
| 60 | 77.81 (0.53) | 98.72 (0.56) |
| 70 | 77.88 (0.27) | 98.59 (0.32) |
| 80 | 75.86 (0.11) | 98.34 (0.07) |
| 90 | 73.26 (0.02) | 98.46 (0.004) |
| 100 | 73.12 (0.00) | 98.54 (0.000) |

Figure 14:
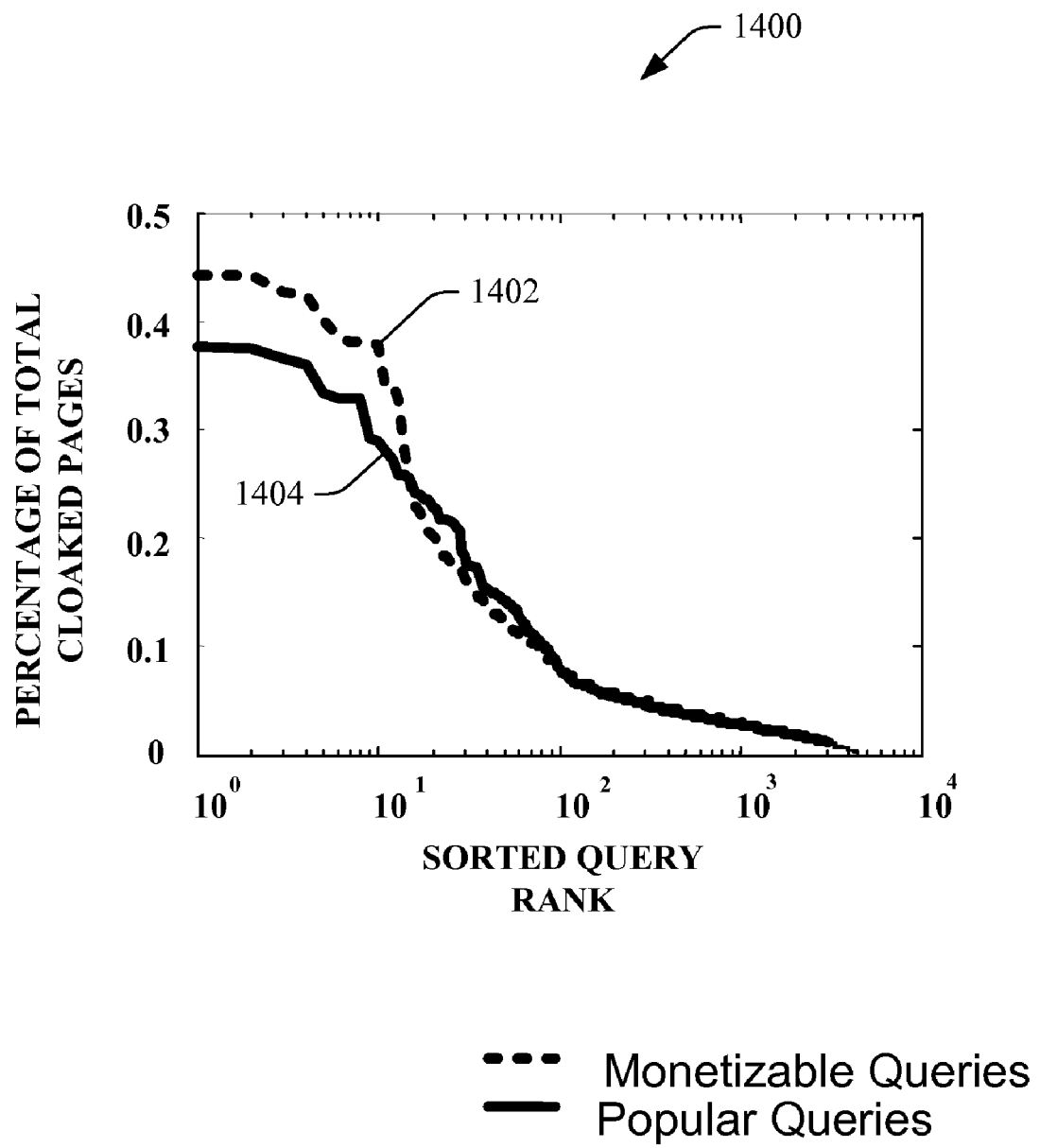
FIG. 14 depicts a graph illustrating the distribution of cloaked pages over a set of search queries.

Referring now to FIG. 14, a graph 1400 depicts distribution of cloaking spam URLs over different queries. A graph line 1402 illustrating percentage of cloaked pages for monetizable queries and a graph line 1404 illustrating percentage of cloaked pages for popular queries show a dramatic decrease in cloaked pages for low ranked queries. Both popular and monetizable query sets were independently sorted such that the percentage curves are monotonically decreasing with increasing sorted query rank. Note that the two query sets are not the same, only 17% of the queries appear in both the popular and monetizable query sets. On average, the top 100 (2%) most cloaked queries have ten times as many cloaking URLs within their search results than the bottom 4900 queries (98%). This skewed distribution gives an effective way of monitoring and detecting cloaked URLs. Further analysis (e.g. manual analysis) can be optimized by starting with the most frequently cloaked queries once can efficiently and quickly identify cloaked URLs In order to provide a context for the various aspects of the disclosed subject matter, FIGS. 15 and 16 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the system and methods disclosed herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics (e.g., personal media players, television set top boxes, digital video recorders, video game systems) and the like. The illustrated aspects may also be practiced in distributed computing environments where tasks are performed by remote processing devices that are linked through a communications network. However, some, if not all aspects of the systems and methods described herein can be practiced on stand-alone computers. In a distributed computing environment, program modules may be located in both local and remote memory storage devices.

With reference again to FIG. 15, the exemplary environment 1500 for implementing various aspects of the embodiments includes a mobile device or computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures may also be employed as the processing unit 1504.

The system memory 1506 includes read-only memory (ROM) 1510 and random access memory (RAM) 1512. A basic input/output system (BIOS) is stored in a non-volatile memory 1510 such as ROM, EPROM, EEPROM, which BIOS contains the basic routines that help to transfer information between elements within the computer 1502, such as during start-up. The RAM 1512 can also include a high-speed RAM such as static RAM for caching data.

The computer or mobile device 1502 further includes an internal hard disk drive (HDD) 1514 (e.g., EIDE, SATA), which internal hard disk drive 1514 may also be configured for external use in a suitable chassis (not shown), a magnetic floppy disk drive (FDD) 1516, (e.g., to read from or write to a removable diskette 1518) and an optical disk drive 1520, (e.g. reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and IEEE 1194 interface technologies. Other external drive connection technologies are within contemplation of the subject systems and methods.

The drives and their associated computer-readable media provide nonvolatile storage of data, data structures, computer-executable instructions, and so forth. For the computer 1502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods for the embodiments of the data management system described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. It is appreciated that the systems and methods can be implemented with various commercially available operating systems or combinations of operating systems.

A user can enter commands and information into the computer 1502 through one or more wired/wireless input devices, e.g. a keyboard 1538 and a pointing device, such as a mouse 1540. Other input devices (not shown) may include a microphone, an IR remote control, a joystick, a game pad, a stylus pen, touch screen, or the like. These and other input devices are often connected to the processing unit 1504 through an input device interface 1542 that is coupled to the system bus 1508, but can be connected by other interfaces, such as a parallel port, an IEEE 1194 serial port, a game port, a USB port, an IR interface, etc. A display device 1544 can be used to provide a set of group items to a user. The display devices can be connected to the system bus 1508 via an interface, such as a video adapter 1546.

The mobile device or computer 1502 may operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g. a wide area network (WAN) 1554. Such LAN and WAN networking environments are commonplace in offices and companies, and facilitate enterprise-wide computer networks, such as intranets, all of which may connect to a global communications network, e.g., the Internet.

When used in a LAN networking environment, the computer 1502 is connected to the local network 1552 through a wired and/or wireless communication network interface or adapter 1556. The adaptor 1556 may facilitate wired or wireless communication to the LAN 1552, which may also include a wireless access point disposed thereon for communicating with the wireless adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wired or wireless device, is connected to the system bus 1508 via the serial port interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with any wireless devices or entities operatively disposed in wireless communication, e.g., a printer, scanner, desktop and/or portable computer, PDA, communications satellite, any piece of equipment or location associated with a wirelessly detectable tag (e.g. a kiosk, news stand, restroom), and telephone. The wireless devices or entities include at least Wi-Fi and Bluetooth™ wireless technologies. Thus, the communication can be a predefined structure as with a conventional network or simply an ad hoc communication between at least two devices.

Wi-Fi allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

FIG. 16 is a schematic block diagram of a sample-computing environment 1600 with which the systems and methods described herein can interact. The system 1600 includes one or more client(s) 1602. The client(s) 1602 can be hardware and/or software (e.g. threads, processes, computing devices). The system 1600 also includes one or more server(s) 1604. Thus, system 1600 can correspond to a two-tier client server model or a multi-tier model (e.g., client, middle tier server, data server), amongst other models. The server(s) 1604 can also be hardware and/or software (e.g., threads, processes, computing devices). One possible communication between a client 1602 and a server 1604 may be in the form of a data packet adapted to be transmitted between two or more computer processes. The system 1600 includes a communication framework 1606 that can be employed to facilitate communications between the client(s) 1602 and the server(s) 1604. The client(s) 1602 are operably connected to one or more client data store(s) 1608 that can be employed to store information local to the client(s) 1602. Similarly, the server(s) 1604 are operably connected to one or more server data store(s) 1610 that can be employed to store information local to the servers 1604.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A computer-implemented system that facilitates detection of a cloaked web page, comprising:
    a memory having computer executable components stored thereon; and
    a processor communicatively coupled to the memory, the processor configured to execute the computer executable components, the computer executable components comprising:
        a term analysis component configured to determine a term score for at least one term included in a content of a web page, wherein the term score is based on a commercial value assigned to the at least one term; and
        a page analysis component configured to compute a page score based on a difference in commercial values between a first set of terms in a browser version of the web page and a second set of terms in a web crawler version of the web page, wherein the page score is indicative of a probability that the web page is cloaked.

2. The system of claim 1, further comprising a popularity component configured to evaluate a popularity of the at least one term, wherein the term score is based at least in part upon the popularity.

3. The system of claim 2, the popularity is based at least in part upon usage data obtained from a search query log.

4. The system of claim 1, further comprising a market value component configured to evaluate a market value of the at least one term, wherein the term score is based at least in part upon the market value.

5. The system of claim 4, wherein the market value is based at least in part upon web advertisement monetization data.

6. The system of claim 1, further comprising a page order component configured to prioritize a set of web pages as a function of the term score, wherein the web page is a member of the set of web pages.

7. The system of claim 1, wherein the difference in commercial values includes a normalized term frequency difference.

8. A method that facilitates detection of web spam, comprising:
    employing a processor to execute computer executable instructions stored on a non-transitory computer readable storage medium to implement the following acts:
    identifying at least one term embedded within a content of a web page;
    determining a term score for the at least one term, wherein the term score is of based on a commercial value assigned to the at least one term;
    computing a difference in commercial values between a first set of terms in a browser version of the web page and a second set of terms in a web crawler version of the web page; and
    ascertaining a probability that the web page is a web spam as a function of the difference in commercial values.

9. The method of claim 8, further comprising:
    determining a popularity of the at least one term; and
    determining a market value of the at least one term, wherein the term score is a function of at least one of the popularity or the market value of the at least one term.

10. The method of claim 9, wherein the term score is a function of a frequency of occurrence of the at least one term.

11. The method of claim 9, wherein the term score is a function of advertising monetization information associated with the at least one term.

12. The method of claim 8, further comprising:
    performing a comparison between the term score and at least one threshold value; and
    classifying the web page as a function of the comparison.

13. The method of claim 8, wherein the at least one term is identified based at least in part upon query log information associated with the web page.

14. The method of claim 8, wherein the at least one string term is included in a set of terms that differ between the crawler version and the browser version of the web page.

15. The method of claim 8, further comprising ordering a set of web pages based at least in part upon the term score, wherein the web page is a member of the set of web pages.

16. The method of claim 8, further comprising:
    generating a cloaking score as a function of the difference in commercial values.

17. The method of claim 8, further comprising determining a normalized term frequency difference between the browser version and the crawler version of the web page.

18. The method of claim 8, wherein the term score is based at least in part upon a position of the at least one term on the web page.

19. A computer-implemented system that facilitates detection of a cloaked web page, comprising:
    a memory having computer executable components stored thereon; and
    a processor communicatively coupled to the memory, the processor configured to execute the computer executable components, the computer executable components comprising:
        a popularity component configured to determine a popularity of at least one term included in a content of a web page as a function of a frequency of occurrence of the at least one term;
        a market value component configured to evaluate a market value of the at least one term as a function of advertisement monetization information;
        a term analysis component configured to determine a term score based on a commercial value assigned to the at least one term, wherein the commercial value is a function of the popularity and the market value; and
        a page analysis component configured to facilitate an evaluation of a probability that the web page is cloaked based at least in part upon a difference in commercial values between a first set of terms in a browser version of the web page and a second set of terms in a web crawler version of the web page.

* * * * *